(12) United States Patent
Yoon et al.

(10) Patent No.: US 10,432,886 B2
(45) Date of Patent: Oct. 1, 2019

(54) DISPLAY SYSTEM, DISPLAY APPARATUS, AND CONTROLLING METHOD THEREOF

(71) Applicant: SAMSUNG ELECTRONICS CO., LTD., Suwon-si (KR)

(72) Inventors: Seung-il Yoon, Yongin-si (KR); Kwan-young Kim, Suwon-si (KR); Sergei Sudakov, Suwon-si (KR); Jae-min Soh, Suwon-si (KR); Ji-hyo Lee, Suwon-si (KR); Sang-jin Choi, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/393,564

(22) Filed: Dec. 29, 2016

(65) Prior Publication Data

US 2017/0195611 A1    Jul. 6, 2017

(30) Foreign Application Priority Data

Jan. 5, 2016 (KR) .................. 10-2016-0001117

(51) Int. Cl.
*H04N 5/44* (2011.01)
*H04N 21/422* (2011.01)
(Continued)

(52) U.S. Cl.
CPC .......... *H04N 5/4403* (2013.01); *G08C 19/28* (2013.01); *H04N 21/25841* (2013.01);
(Continued)

(58) Field of Classification Search
CPC ............................ H04N 13/007; H04N 21/44
(Continued)

(56) References Cited

U.S. PATENT DOCUMENTS 4,807,052 A * 2/1989 Amano .................. H04B 1/202
                                                340/12.29
4,949,181 A * 8/1990 Elberbaum ...... G08B 13/19634
                                                348/211.5
(Continued)

FOREIGN PATENT DOCUMENTS

EP        2871594 A2     5/2015
EP        2 892 039 A1   7/2015
(Continued)

OTHER PUBLICATIONS

International Search Report and Written Opinion (PCT/ISA/210/237) dated Mar. 23, 2017 issued by the International Searching Authority in counterpart International Application PCT/KR2017/000008.

(Continued)

*Primary Examiner* — Paulos M Natnael
(74) *Attorney, Agent, or Firm* — Sughrue Mion, PLLC

(57) ABSTRACT

A display system is provided. The display system includes a display apparatus configured to display an image, an image providing apparatus configured to provide an image, and a remote control device configured to transmit a control signal for controlling the image providing apparatus. The display apparatus is further configured to control the remote control device to transmit at least one control signal to the image providing apparatus, and acquire apparatus information of the image providing apparatus by analyzing an image provided by the image providing apparatus to the display apparatus in response the image providing device receiving the at least one control signal transmitted by the remote control device.

19 Claims, 13 Drawing Sheets

(51) Int. Cl.
*H04N 21/44* (2011.01)
*G08C 19/28* (2006.01)
*H04N 21/258* (2011.01)

(52) U.S. Cl.
CPC . *H04N 21/42225* (2013.01); *H04N 21/42226* (2013.01); *H04N 21/44008* (2013.01); *G08C 2201/20* (2013.01); *G08C 2201/21* (2013.01); *G08C 2201/30* (2013.01); *G08C 2201/92* (2013.01); *H04N 2005/4407* (2013.01); *H04N 2005/4435* (2013.01)

(58) Field of Classification Search
USPC ............... 348/569, 563–565, 552–553, 734
See application file for complete search history.

(56) References Cited

U.S. PATENT DOCUMENTS

| | | | | |
|---|---|---|---|---|
| 8,132,105 | B1* | 3/2012 | Dubil | G08C 19/28 |
| | | | | 715/716 |
| 9,443,192 | B1* | 9/2016 | Cosic | G06N 3/02 |
| 2001/0029500 | A1* | 10/2001 | Tanaka | H04N 1/00127 |
| 2003/0206193 | A1* | 11/2003 | Sato | G06F 3/1462 |
| | | | | 715/736 |
| 2004/0143847 | A1* | 7/2004 | Suzuki | H04B 1/202 |
| | | | | 725/61 |
| 2006/0158838 | A1* | 7/2006 | Kinoshita | H04N 5/4403 |
| | | | | 361/679.22 |
| 2006/0170763 | A1* | 8/2006 | Kawamura | H04N 7/147 |
| | | | | 348/14.09 |
| 2007/0208440 | A1* | 9/2007 | Bliss | G05B 19/056 |
| | | | | 700/87 |
| 2007/0268936 | A1* | 11/2007 | Kim | H04N 5/44513 |
| | | | | 370/486 |
| 2007/0300188 | A1* | 12/2007 | Kim | G06F 3/04817 |
| | | | | 715/835 |
| 2011/0063284 | A1* | 3/2011 | Sudoh | G09G 5/00 |
| | | | | 345/418 |
| 2011/0119585 | A1* | 5/2011 | Kim | G06F 17/30905 |
| | | | | 715/719 |
| 2011/0157478 | A1* | 6/2011 | McRae | H04N 5/4403 |
| | | | | 348/734 |
| 2011/0205965 | A1* | 8/2011 | Sprigg | G06F 9/4411 |
| | | | | 370/328 |
| 2012/0044051 | A1* | 2/2012 | Chang | G06F 1/1626 |
| | | | | 340/5.83 |
| 2013/0117384 | A1* | 5/2013 | Martch | H04L 67/125 |
| | | | | 709/206 |
| 2013/0271659 | A1* | 10/2013 | Na | H04N 5/4403 |
| | | | | 348/563 |
| 2013/0275232 | A1* | 10/2013 | Oh | G06Q 30/0273 |
| | | | | 705/14.69 |
| 2014/0066093 | A1* | 3/2014 | Yoo | G01S 5/0072 |
| | | | | 455/456.1 |
| 2014/0075491 | A1* | 3/2014 | Hsu | H04N 21/4135 |
| | | | | 725/153 |
| 2014/0218621 | A1* | 8/2014 | Kim | H04N 5/4403 |
| | | | | 348/734 |
| 2015/0058877 | A1* | 2/2015 | Lakkundi | H04N 21/439 |
| | | | | 725/19 |
| 2015/0279037 | A1* | 10/2015 | Griffin | G06F 3/1446 |
| | | | | 345/1.3 |
| 2016/0066893 | A1* | 3/2016 | Cho | A61B 8/54 |
| | | | | 600/459 |
| 2016/0134717 | A1* | 5/2016 | McNeill | H04W 4/029 |
| | | | | 709/217 |
| 2016/0154824 | A1* | 6/2016 | Song | G06F 17/30265 |
| | | | | 345/634 |
| 2017/0038796 | A1* | 2/2017 | Kawase | G06Q 30/02 |
| 2017/0041685 | A1* | 2/2017 | Kwon | H04N 21/64322 |
| 2017/0086785 | A1* | 3/2017 | Bjaerum | A61B 8/4254 |
| 2017/0195609 | A1* | 7/2017 | Kim | G06F 3/0346 |
| 2017/0195612 | A1* | 7/2017 | Yoon | H04N 21/42204 |

FOREIGN PATENT DOCUMENTS

| | | |
|---|---|---|
| JP | 05-161180 A | 6/1993 |
| JP | 2012-156727 A | 8/2012 |
| KR | 10-2005-0075586 A | 7/2005 |
| KR | 10-2006-0115144 A | 11/2006 |
| KR | 10-2007-0058199 A | 6/2007 |
| KR | 10-0765789 B1 | 10/2007 |
| KR | 10-2007-0112596 A | 11/2007 |
| KR | 10-2009-0032229 A | 4/2009 |
| KR | 10-2014-0100694 A | 8/2014 |
| KR | 10-2015-0064710 A | 6/2015 |
| WO | 2015/072665 A1 | 5/2015 |

OTHER PUBLICATIONS

Communication dated Jun. 19, 2017 by the European Patent Office in counterpart European Patent Application No. 17150024.2.

* cited by examiner

1000

DISPLAY SYSTEM, DISPLAY APPARATUS, AND CONTROLLING METHOD THEREOF

CROSS-REFERENCE TO RELATED APPLICATIONS

This application claims priority from Korean Patent Application No. 10-2016-0001117, filed on Jan. 5, 2016 in the Korean Intellectual Property Office, the disclosure of which is incorporated herein by reference in its entirety.

BACKGROUND

1. Field

Apparatuses and methods consistent with exemplary embodiments relate to controlling method thereof, and more particularly, to a display apparatus capable of acquiring apparatus information of an external apparatus, a controlling method thereof, and a display system including the display apparatus.

2. Description of the Related Art

With the advancement of digital display technology, it has become possible to connect various types of external apparatuses that provide video content, such as a set-top box, a digital versatile disc (DVD) player, an audio player, and the like to a display apparatus. In general, remote controls respectively provided for the external apparatuses are used in order to control the external apparatuses, but as the number of interconnected devices increases, the number of remote controls also increases.

Therefore, an integrated or universal remote control has been developed so as to control multiple electronic apparatuses through one remote device. However, a process of setting a correct control code set is required to control an electronic apparatus that is not registered in the integrated remote controller. In other words, a user is expected to input model information, manufacturer information, and the like of an external electronic apparatus one by one in order to pair the integrated remote controller with the appropriate device.

However, this process is very complicated and thus is frequently ignored by users, and the users continue to use several dedicated remote controls for individual apparatuses.

Therefore, there is a need for a way of conveniently setting up an integrated remote control.

SUMMARY

Exemplary embodiments overcome the above disadvantages and other disadvantages not described above. Also, the present invention is not required to overcome the disadvantages described above, and an exemplary embodiment may not overcome any of the problems described above.

Exemplary embodiments provide a display apparatus capable of acquiring apparatus information of an external apparatus, a controlling method thereof, and a display system including the display apparatus.

According to an aspect of an exemplary embodiment, a display system includes a display apparatus configured to display an image, an image providing apparatus configured to provide an image, and a remote control device configured to transmit a control signal for controlling the image providing apparatus. The display apparatus may be further configured to control the remote control device to transmit at least one control signal to the image providing apparatus, and acquire apparatus information of the image providing apparatus by analyzing an image provided by the image providing apparatus to the display apparatus in response the image providing device receiving the at least one control signal transmitted by the remote control device.

According to an aspect of another exemplary embodiment, a display apparatus includes a communicator configured to communicate with a remote control device; a display configured to display an image; and a processor configured to control the communicator to transmit, to the remote control device, a control command which controls the remote control device to transmit a control signal to the image providing apparatus, and acquire apparatus information of the image providing apparatus by analyzing an image that is provided by the image providing apparatus in response to the image providing apparatus receiving the control signal transmitted by the remote control device.

According to an aspect of another exemplary embodiment, a method of controlling a display apparatus includes transmitting, to a remote control device, a control command, which controls the remote control device to transmit a control signal to an image providing apparatus; and acquiring apparatus information of the image providing apparatus by analyzing an image that is provided to the display apparatus by the image providing apparatus in response to the image providing apparatus receiving the control command transmitted by the remote control device.

According to an aspect of another exemplary embodiment, a computer-readable recording medium including a program for performing a method of controlling a display apparatus. The method may include transmitting, to a remote control device, a control command, which enables the remote control device to transmit a control signal, and acquiring apparatus information of the image providing apparatus by analyzing an image provided from the image providing apparatus connected to the display apparatus after transmitting the control command.

According to an aspect of another exemplary embodiment, there is provided a non-transitory computer-readable storage medium storing instructions which, when executed by a processor, cause the processor to perform operations comprising: receiving, by a display device, a first image from an image output device connected to the display device, in response to receiving the first image, transmitting, by the display device, a control command for a remote control device to transmit a control signal, the remote control device being associated with the image output device, in response to transmitting the control command, receiving, by the display device, a second image from the image output device, comparing, by the display device, the first image and the second image to identify a difference between the first image and the second image, and determining, by the display device, a device type of the image output device based on the difference between the first image and the second image.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF EXEMPLARY EMBODIMENTS

Figure 1:
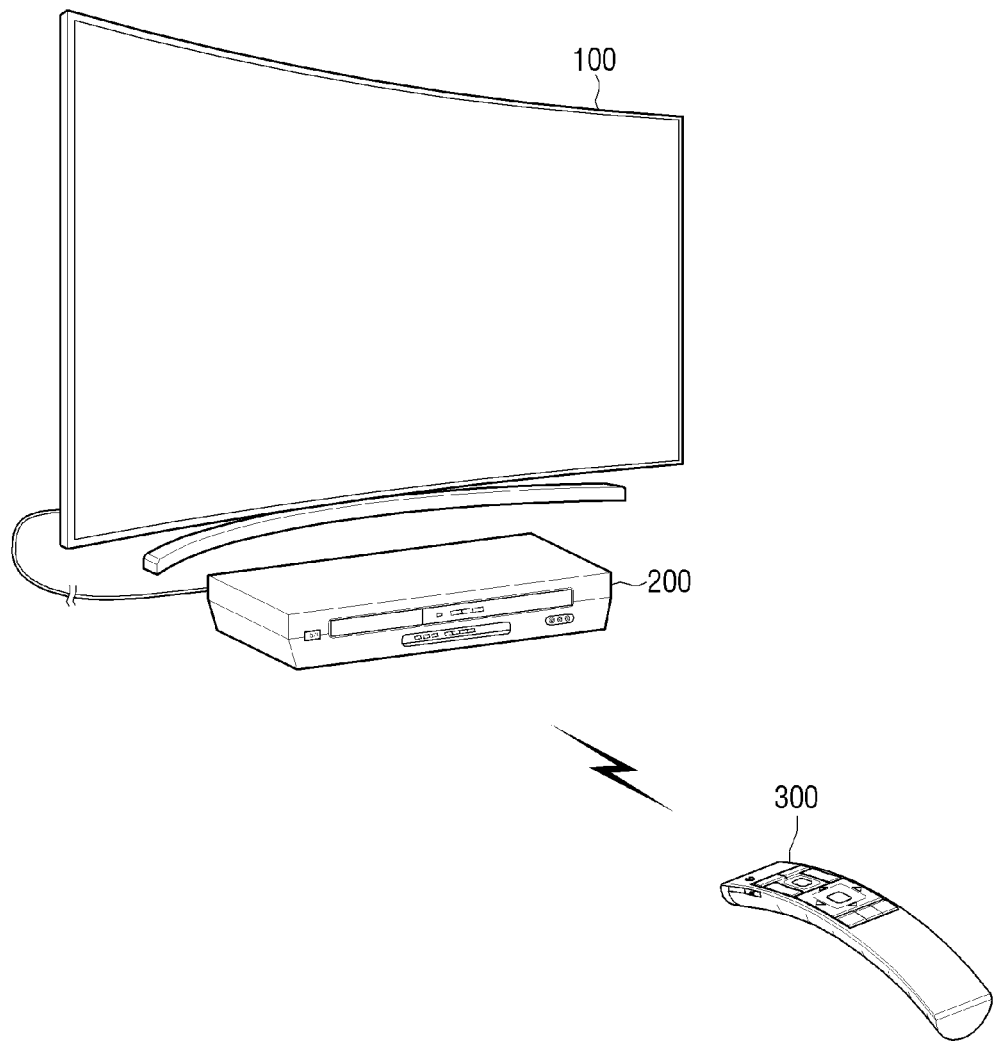
FIG. 1 is a view illustrating a display system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

The terms used herein are selected as general terms that are currently widely used in consideration of their functions in the present invention. However, these terms may depend on intentions or legal or technical interpretations of those skilled in the art, emergences of new technologies, and the like. Also, there may be some terms arbitrarily selected by an applicant. These terms may be construed as meanings defined in the present specification and may be construed based on whole contents of the present specification and common technical knowledge of the art as long as there are no detailed definitions of the terms.

Also, the same reference numerals or symbols described in the attached drawings denote parts or elements that actually perform the same functions. For convenience of descriptions and understanding, the same reference numerals or symbols are used and described in different exemplary embodiments. In other words, although elements having the same reference numerals are all illustrated in a plurality of drawings, the plurality of drawings do not mean one exemplary embodiment.

Also, the terms "first," "second," etc. may be used to describe diverse components, but the components are not limited by the terms. The terms are only used to distinguish one component from the others. For example, used orders, arrangement orders, or the like of elements that are combined with these ordinal numbers may not be limited by the numbers. If necessary, the ordinal numbers may be respectively replaced and used.

The singular expression also includes the plural meaning as long as it does not differently mean in the context. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor (not shown).

Also, when any part is connected to another part, this includes a direct connection and an indirect connection through another medium. Unless otherwise defined, when any part includes any element, it may mean that any part further include other elements without excluding other elements.

Hereinafter, the present invention will be described in detail with reference to the attached drawings.

FIG. 1 is a view illustrating a display system 1000 according to an exemplary embodiment.

As shown in FIG. 1, the display system 1000 includes a display apparatus 100, an image providing apparatus 200, and a remote control device 300.

The display apparatus 100 may be a TV as shown in FIG. 1, but this is merely an exemplary embodiment. The display apparatus 100 may be realized as various types of apparatuses such as a smartphone, a tablet personal computer (PC), a desktop PC, a projector, and the like.

The image providing apparatus 200 may provide the display apparatus 100 with an image. As shown in FIG. 1, the image providing apparatus 200 may be connected to the display apparatus 100 by wire. For example, the image providing apparatus 200 may provide the image through a High Definition Multimedia Interface (HDMI) port of the display apparatus 100. However, the image providing apparatus 200 is not limited thereto and may be realized to perform a wireless communication so as to provide the display apparatus 100 with the image.

The image providing apparatus 200 may be realized as various types of apparatuses such as a digital versatile disc (DVD) player, a Blue-ray disc (BD) player, a PC, a Universal Serial Bus (USB) device, a video game console, a home theater system, an audio player, a set-top box, an over-the-air (OTA) antenna, an over-the-top (OTT) device, and the like.

The remote control device 300 may be implemented as various types of devices capable of transmitting a control signal for controlling other apparatuses. For example, the remote control device 300 may be an dedicated remote control capable of controlling only a particular apparatus, an integrated remote control (e.g., Multi-Brand Remote (MBR), otherwise known as a universal remote control) capable of controlling multiple apparatuses, or a portable device such as a smartphone, a Personal Digital Assistant (PDA), or the like.

The remote control device 300 may include a direction key button, a number key button, a menu button, a touch pad, and the like. The remote control device 300 may generate various types of control signals corresponding to the direction key button, the touch pad, and other buttons.

The display apparatus 100 may perform an analysis with respect to an image provided from the image providing apparatus 200 in order to acquire apparatus information of the image providing apparatus 200 and may perform various operations by using the acquired apparatus information. For example, the display apparatus 100 may set an integrated remote control, which enables the remote control device 300 to control the image providing apparatus 200 by using the acquired apparatus information of the image providing apparatus 200, with respect to the remote control device 300.

As another example, the display apparatus 100 may update an apparatus name (e.g., apparatus type, model name, etc.) of the image providing apparatus 200 in the display apparatus 100 based on the acquired apparatus information of the image providing apparatus 200. The apparatus information may be any information that may be used identify the model, type, or manufacturer of the image providing apparatus 200.

Hereinafter, the display apparatus 100 in the display system 1000 described above will be described in more detail.

Figure 2:
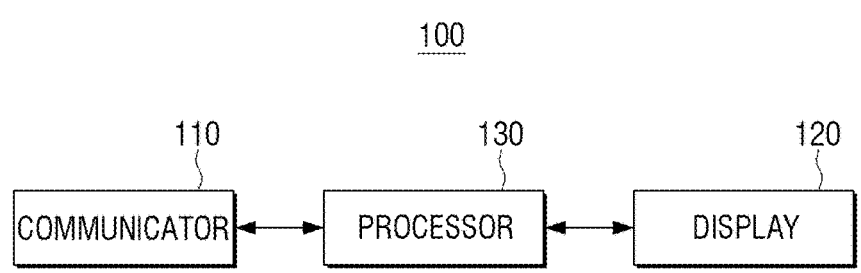
FIG. 2 is a block diagram of a configuration of a display apparatus according to an exemplary embodiment.

FIG. 2 is a block diagram illustrating the display apparatus 100 according to an exemplary embodiment.

As shown in FIG. 2, the display apparatus 100 includes a communicator 110, a display 120, and a processor 130.

The communicator 110 is an element that performs wireless or wired communications with various types of external apparatuses. Specifically, the communicator 110 may include an input/output (I/O) port for a wired connection to an external apparatus and various types of communication chips such as a Wi-Fi chip, a Bluetooth chip, a near-field communication (NFC) chip, a wireless communication chip, and the like for performing wireless communications.

The communicator 110 may communicate with the image providing apparatus 200 to receive an image from the image providing apparatus 200. Also, the communicator 110 may transmit a control command, which enables the remote control device 300 to transmit a specific control signal to the remote control device 300. According to as aspect of an exemplary embodiment, the communicator 110 may receive the control signal transmitted from the remote control device 300 in order to control the image providing apparatus 200.

The display 120 is an element that displays various types of screens under control of the processor 130.

For example, the display 120 may be implemented as a Liquid Crystal Display (LCD), a Cathode-Ray Tube (CRT), a Plasma Display Panel (PDP), an Organic Light Emitting Diode (OLED) display, or a Transparent OLED (TOLED) display, or the like. Also, the display 120 may be implemented as a touch screen type capable of sensing a touch manipulation of a user.

The display 120 may display an image provided from the image providing apparatus 200. The display 120 may also display various types of user interface (UI) screens that are preloaded.

The processor 130 is an element for controlling an overall operation of the display apparatus 100.

For example, the processor 130 may include a Central Processing Unit (CPU), a Random Access Memory (RAM), a Read-Only Memory (ROM), and a system bus. Here, the ROM is an element that stores a command set for system booting, and the CPU boots a system by copying an operating system (OS) stored in a storage unit of the display apparatus 100 into the RAM and executing the OS according to a command stored in the ROM. Once the system is completely booted, the CPU may perform various operations by copying various types of applications stored in the storage unit into the RAM and executing the applications. The processor 130 has been described above as including merely one CPU but may be implemented as a plurality of CPUs (or Digital Signal Processors (DSPs), System on Chips (SoCs), or the like).

In particular, the processor 130 may acquire apparatus information of the image providing apparatus 200 by cooperating with the remote control device 300. In this case, the processor 130 may acquire information of the image providing apparatus 200 according to a method of complying with attributes of the remote control device 300. In detail, the processor 130 may acquire the information of the image providing apparatus 200 by using different methods depending on whether the remote control device 300 is an exclusive remote controller of the image providing apparatus 200 or the remote control device 300 is an integrated remote controller (e.g., MBR) and not the exclusive remote controller of the image providing apparatus 200.

Hereinafter, a method of acquiring apparatus information of the image providing apparatus 200 by using the display apparatus 100 when the remote control device 300 is an integrated remote control according to an exemplary embodiment will be described.

If the remote control device 300 is the integrated remote control (i.e., a universal remote control), the remote control device 300 may not be able to control the image providing apparatus 200 at first, and thus a setup process for controlling the image providing apparatus 200 may be required. For this, a control code set for controlling the image providing apparatus 200 may be specified.

The image providing apparatus 200 may operate by different control code sets according to the specific manufacturer of the image providing apparatus 100. Here, a control code set refers to a set of information (e.g., a set of waveforms) assigned to respective keys of the remote control device 300 and information about signals generated when the respective keys are selected. Therefore, a manufacturer of the image providing apparatus 200 may need to be identified first in order to control the image providing apparatus 200.

However, the display apparatus 100 may not be able to identify the manufacturer of the image providing apparatus 200 merely through a connection of the image providing apparatus 200 to the display apparatus 100. Therefore, the processor 130 may control the communicator 110 to transmit a control command, which enables the remote control device 300 to transmit a specific control signal to the remote control device 300, and may acquire apparatus information of the image providing apparatus 200 by analyzing an image provided from the image providing apparatus 200 after transmitting the control command. Here, the apparatus information may include information about a manufacturer of the image providing apparatus 200.

In detail, the processor 130 may transmit a plurality of different control commands to the remote control device 300 so as to enable the remote control device 300 to sequentially transmit control signals corresponding to different manufacturers.

This transmission of a control command may start if an image providing apparatus is newly discovered (i.e., if a new image providing apparatus 200 is sensed by the display apparatus 100). If the new image providing apparatus 200 is sensed, the processor 130 may control the communicator 110 to transmit a control command, which enables the remote control device 300 to transmit a specific control code, to the remote control device 300. Alternatively, this transmission of a control command may start according to a manipulation of the user. This will be described in more detail later with reference to FIG. 6.

The control signal that the remote control device 300 transmits according to the control command received from the display apparatus 100 may be a control signal that enables the image providing apparatus 200 to provide the display apparatus 100 with a particular image.

Here, the particular image may be an image including contents through which the processor 130 may recognize the apparatus information of the image providing apparatus 200 through an image analysis. For example, the particular image may be an image including a manufacturer logo of the image providing apparatus 200. In general, the manufacturer logo of the image providing apparatus 200 may be included in a menu screen provided by the image providing apparatus 200. Therefore, the control signal that the remote control device 300 transmits under control of the display apparatus 100 may be a control signal that enables the image providing apparatus 200 to provide the display apparatus 100 with the image of the menu screen. This is merely an example, and the particular image may be any image including contents through which the processor 130 recognizes the apparatus information of the image providing apparatus 200 through an image analysis.

For example, acquiring of apparatus information through a logo will be described in more detail with reference to FIG. 3.

Figure 3:
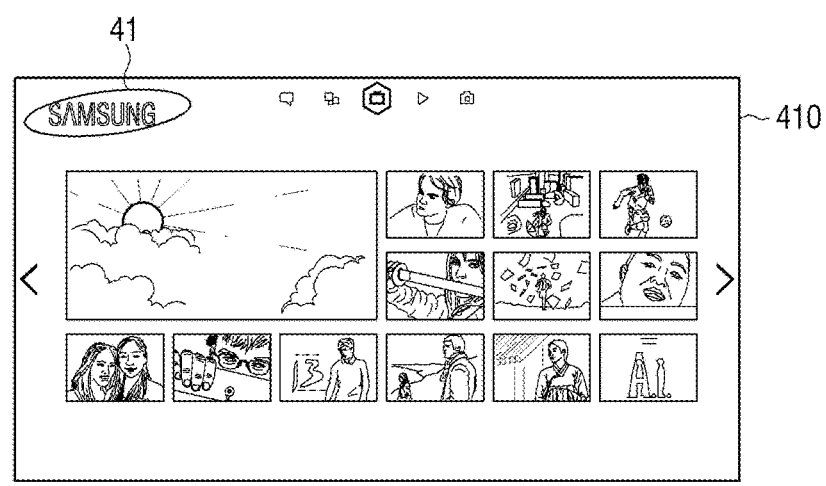
FIGS. 3 and 4 are views illustrating methods of analyzing an image of a display apparatus according to various exemplary embodiments n.

FIG. 3 is a view illustrating a menu screen of the image providing apparatus 200, according to an exemplary embodiment.

In FIG. 3, a menu screen 410 of the image providing apparatus 200, which is provided for the display apparatus 100 according to a control signal transmitted from the remote control device 300, may include a logo 41. The processor 130 may determine whether the logo 41 belongs to any known manufacturer, based on the logos of manufacturers preloaded in the display apparatus 100. Therefore, the processor 130 may acquire apparatus information of the image providing apparatus 200.

As another example, the control signal that the remote control device 300 transmits under control of the display apparatus 100 may be a control signal that enables the image providing apparatus 200 to provide the display apparatus 100 with an image of a particular channel. If the image providing apparatus 200 is a set-top box, the same channel number may provide images of different broadcasting stations according to manufacturers of set-top boxes. For example, CBS may correspond to channel number 1 in a set-top box of company A, and NBC may correspond to channel number 1 in a set-top box of company B. The processor 130 may analyze an image provided from the image providing apparatus 200 after transmitting a control command enabling the remote control device 300 to transmit a control signal enabling an image of channel number 1 to be provided for the display apparatus 100. If there is a CBS logo in the image, the processor 130 may determine the image providing apparatus 200 as a set-top box of company A and, if there is an NBC logo in the image, determine the image providing apparatus 200 as a set-top box of company B. Hereinafter, acquiring of apparatus information through a particular channel image will be described in more detail with reference to FIG. 4.

Figure 4:
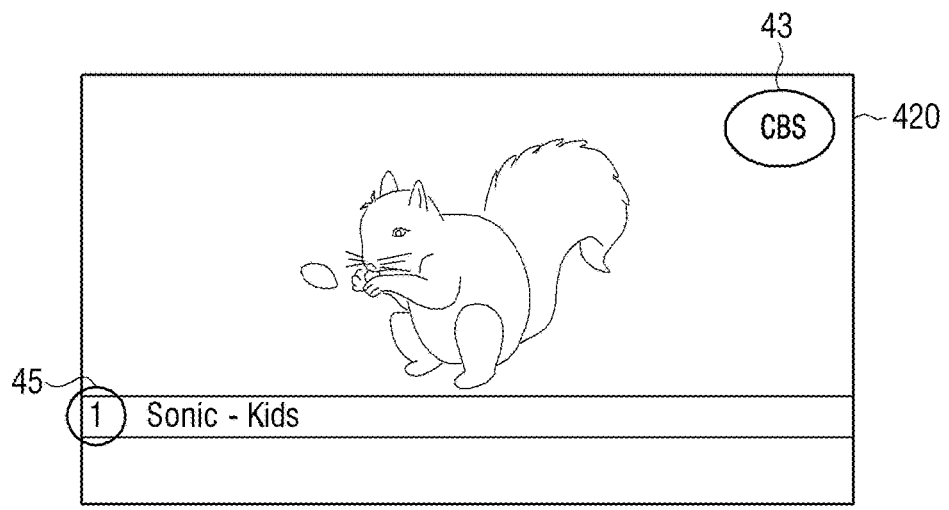

FIG. 4 illustrates an example of a particular channel image of the image providing apparatus 200.

As shown in FIG. 4, a particular channel image 420 of the image providing apparatus 200, which is provided for the display apparatus 100 according to a control signal transmitted from the remote control device 300, may include a channel number 45 and a channel logo 43. The processor 130 may detect whether the channel logo 43 is a logo of a known broadcast network, based on logos of known broadcast networks preloaded in the display apparatus 100. Also, the processor 130 may recognize what number the channel number 45 is, through a character recognition method such as optical character recognition (OCR) or the like. Therefore, the processor 130 may detect that the manufacturer of the image providing apparatus 200 is a manufacturer that associates the channel number 45 to the logo 43, and thus may acquire apparatus information of the image providing apparatus 200.

In other words, as described above, if an image is provided from the image providing apparatus 200 and thus a change is currently sensed from the image after transmitting a control command, the processor 130 may acquire the apparatus information of the image providing apparatus 200 by analyzing the changed image.

As described above, the display apparatus 100 may acquire the apparatus information of the image providing apparatus 200 by controlling the remote control device 300. Hereinafter, this process will be described in more detail with reference to FIG. 5.

Figure 5:
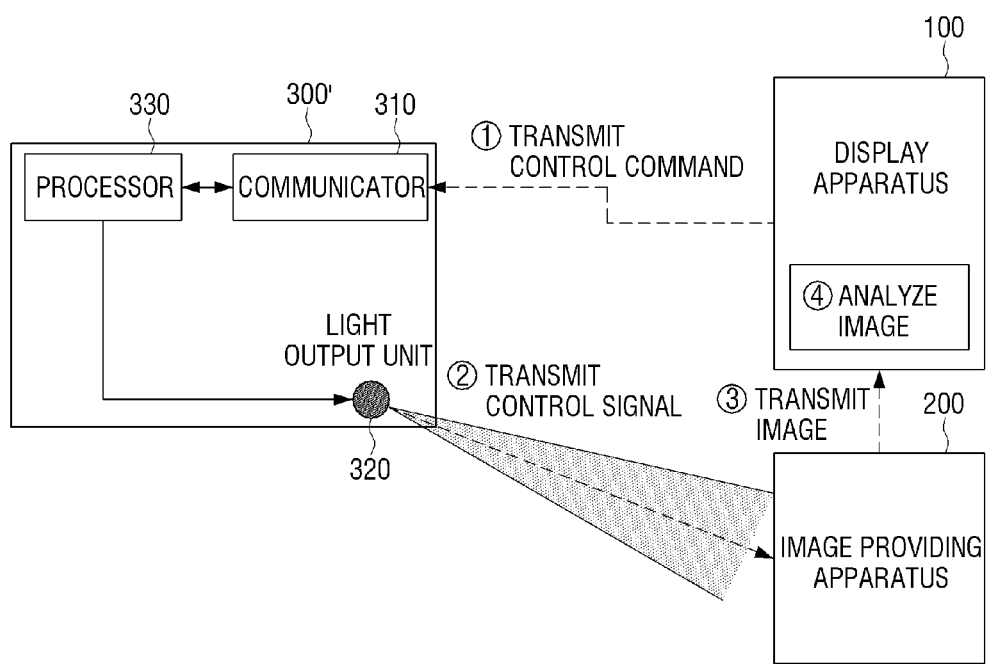
FIG. 5 is a view illustrating a method of acquiring apparatus information of an image providing apparatus by using a display apparatus, according to an exemplary embodiment.

FIG. 5 is a view illustrating a process of acquiring apparatus information of the image providing apparatus 200 by using the display apparatus 100, according to an exemplary embodiment.

The display apparatus 100 may transmit a control command to a remote control device 300' (①). Here, the control command may be for transmitting a control signal included in a control code set corresponding to a manufacturer of the image providing apparatus 200. In this case, the display apparatus 100 may transmit a control command, which is to transmit a control signal included in a control code set corresponding to a manufacturer randomly selected from several manufacturers or a control signal included in a control code set of a manufacturer having a highest market share (i.e., most popular brand), to the remote control device 300'. A control command that is first transmitted may be referred to as a first control command.

The remote control device 300' may include a communicator 310, a light output unit 320, and a processor 330, and receive the control command transmitted from the image providing apparatus 200 through the communicator 310.

The communicator 310 may be an element for performing communications with various types of external apparatuses. For example, the communicator 310 may receive a control command from the display apparatus 100 according to a Bluetooth communication method. Besides the Bluetooth communication method, various types of communication methods such as an NFC method and the like may be used.

Also, the remote control device 300' may transmit a control signal corresponding to the received first control command (②). For example, the processor 330 may transmit a control signal through the light output unit 320. In this case, the light output unit 320 may include an Infrared-Light Emitting Diode (IR-LED) and generate an IR control signal under control of the processor 330.

As described above, a control signal that the remote control device 300' transmits may be a control signal that enables an image including contents for checking apparatus information of the image providing apparatus 200 to be provided for the display apparatus 100. For example, the control signal may be a control signal that enables a menu screen image including a logo of the image providing apparatus 200 to be provided for the display apparatus 100.

If the image providing apparatus 200 provides the display apparatus 100 with an image in response to the control signal transmitted from the remote control device 300' (③), the display apparatus 100 may acquire apparatus information of the image providing apparatus 200 by sensing an image change caused by the provided image and analyzing the changed image (④).

If the image change is not sensed after transmitting the first control command, the display apparatus 100 may transmit a second control command (①) and repeat the operations (②, ③) described above. Here, because the first control command is a control command that enables the control signal included in the control code set corresponding to the manufacturer having the highest market share to be transmitted, the second control command may be a control command that enables a control signal included in a control code set corresponding to a manufacturer having a second highest market share to be transmitted.

In other words, the display apparatus 100 may sequentially transmit the first control command, the second control command, and so forth, which are different from one another, to the remote control device 300' until a change in an image is sensed.

For this, the user may aim the remote control device 300' toward the image providing apparatus 200. Also, as described above, the display apparatus 100 may display an image including a message such as, "Apparatus information is being acquired," during a process of acquiring the apparatus information of the image providing apparatus 200. In other words, the display apparatus 100 may display another image instead of displaying an image provided from the image providing apparatus 200 during a process of acquiring apparatus information.

If an image is not received from the image providing apparatus 200 (i.e., an image change is not sensed even after transmitting a control command for the preset number of times), the processor 130 of the display apparatus 100 may control the display 120 to display a UI inducing a direction change of the remote control device 300'. The UI may include a button for restarting an apparatus information acquiring process, and if the user selects this button after changing a direction or orientation of the remote control device 300', the processor 130 may repeat the apparatus information acquiring process described above.

However, thereafter, even if the apparatus information of the image providing apparatus 200 is not acquired, the processor 130 may be provided with a control code set of a manufacturer, which is not used in a previous process, from an external server so as to retry to acquire the apparatus information.

If the apparatus information of the image providing apparatus 200 is not acquired, the processor 130 may display a UI that enables the user to manually input the apparatus information of the image providing apparatus 200.

The display apparatus 100 may perform integrated remote control setup by using the acquired apparatus information as described above.

Figure 6:
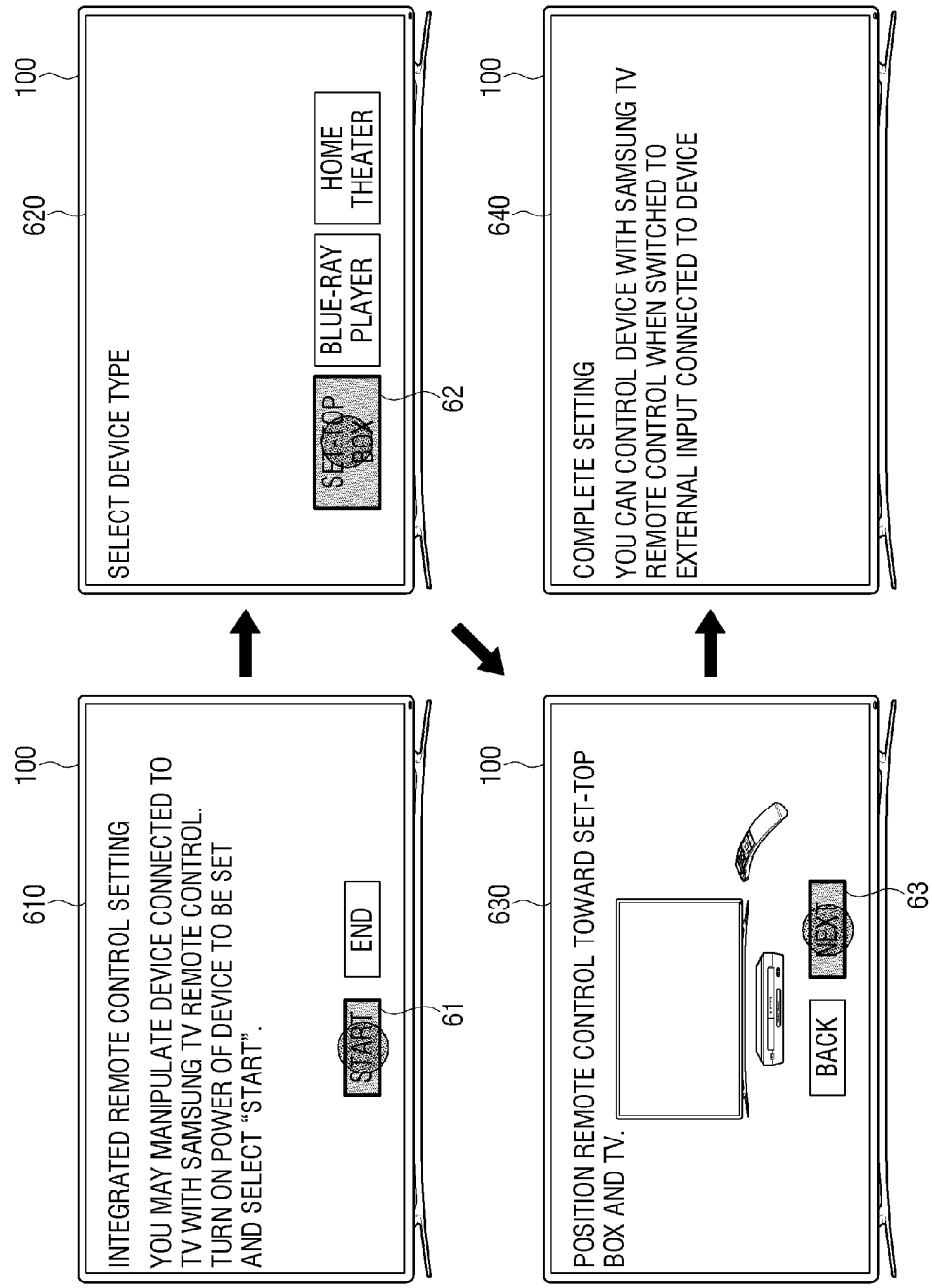
FIG. 6 is a view illustrating a user interface (UI) screen displaying a process of acquiring apparatus information of an image providing apparatus by using a display apparatus, according to an exemplary embodiment.

FIG. 6 is a view illustrating a method of setting an integrated remote control of the remote control device 300' by acquiring an apparatus information of the image providing apparatus 200 by using the display apparatus 100.

In FIG. 6, the display apparatus 100 may display an integrated remote control setup start screen 610 according to a user manipulation. The integrated remote control setup start screen 610 may include a message for turning on power of a device to be controlled by the remote control device 300'.

Also, if the user selects a "start" button 61 on the integrated remote control setup start screen 610, the display apparatus 100 may display a screen 620 for selecting a device type. The user may select a type of the image providing apparatus 200 that is to be controlled by the remote control device 300'. A case where the user selects a set-top box 62 will be subsequently described.

Also, the display apparatus 100 may display a screen 630 including a message for positioning the remote control device 300' toward a set-top box and a display apparatus. If the user selects a button 63 for going on to a next step on the screen 630, the display apparatus 100 may perform an operation as described with reference to FIG. 5. In other words, the display apparatus 100 sequentially transmits control commands corresponding to control code sets of different manufacturers to the remote control device 300'. Therefore, if the remote control device 300' transmits a control signal for displaying a particular image to a set-top box, and the set-top box provides the display apparatus 100 with an image in response to the control signal, the display apparatus 100 acquires apparatus information of the set-top box by analyzing the provided image.

If apparatus information acquiring succeeds by a process as described above, the display apparatus 100 displays a setting complete screen 640.

If apparatus information acquiring fails although the display apparatus 100 transmits a control command to the remote control device 300' a specific number of times or more, the display apparatus 100 may display a UI inducing a direction change so as to induce the user to position the remote control device 300' toward the display apparatus 100 and the set-top box.

If apparatus information of the image providing apparatus 200 is acquired by the above-described method, the user may control the image providing apparatus 200 through the remote control device 300'. In detail, the display apparatus 100 may control the communicator 110 to transmit a control code set corresponding to the acquired apparatus information to the remote control device 300'. Also, the remote control device 300' may control the image providing apparatus 200 by using the received control code set.

According to another method, the display apparatus 100 may store information about a corresponding relation between a button of the remote control device 300' and a control code for controlling the image providing apparatus 200. Therefore, the display apparatus 100 may convert a first control signal generated by the remote control device 300' into a second control signal appropriate for controlling the image providing apparatus 200. In detail, if the user selects a particular button on the remote control device 300', the remote control device 300' may transmit the first control signal corresponding to the selected button. The display apparatus 100 receives the first control signal and transmits a command, which enables the received first control signal and the second control signal corresponding to the apparatus information of the image providing apparatus 200 to be transmitted, to the remote control device 300'. Also, the remote control device 300' may control the image providing apparatus 200 by transmitting the second control signal according to the command received from the display apparatus 100.

The apparatus information of the image providing apparatus 200 may be used to set an integrated remote control of the remote control device 300' as described above and may also be used to update a source name of the image providing apparatus 200. This will be described later with reference to FIG. 9.

In the above-described exemplary embodiment, the method of acquiring the apparatus information of the image providing apparatus 200 by using the display apparatus 100 if the remote control device 300 is not an exclusive (i.e., dedicated) remote control of the image providing apparatus 200 has been described. Hereinafter, a method of acquiring apparatus information of the image providing apparatus 200 by using the display apparatus 100 if the remote control device 300 is an exclusive remote controller of the image providing apparatus 200 will be described with reference to FIG. 7.

Figure 7:
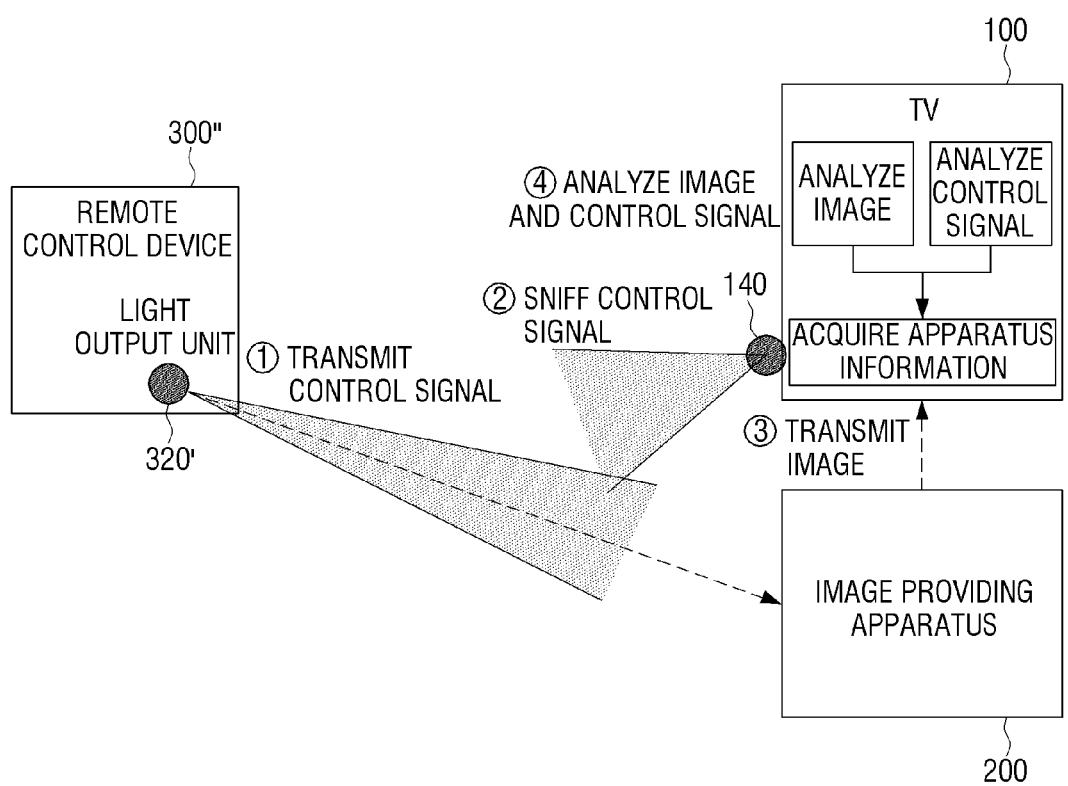
FIG. 7 is a view illustrating a method of acquiring apparatus information of an image providing apparatus by using a display apparatus, according to another exemplary embodiment.

FIG. 7 is a view illustrating a method of acquiring apparatus information of the image providing apparatus 200 by using the display apparatus 100, according to another exemplary embodiment. Here, the display apparatus 100 may include a light receiver 140 along with the communicator 110, the display 120, and the processor 130. The light receiver 140 may receive an IR control signal, which is output and transmitted from a light output unit 320' of the remote control device 300, through a light window.

If the user transmits a control signal for controlling the image providing apparatus 200 (①) by pressing and manipulating an arbitrary key of a remote control device 300", the display apparatus 100 may receive the control signal through the light receiver 140 (②). This is referred to as IR sniffing.

Also, the image providing apparatus 200 may receive the control signal, and transmit an image to the display apparatus 100 according to the received control signal (③).

If the display apparatus 100 also receives the control signal, the image is provided from the image providing apparatus 200, and an image change is sensed, the display apparatus 100 analyzes the received control signal and a current image (④).

In detail, the processor 130 may identify the received control signal based on a waveform of the control signal. Also, the processor 130 may check a control command corresponding to the control signal through an image analysis of comparing an image provided before receiving the control signal with an image provided after receiving the control signal. This will be described in more detail with reference to FIG. 8.

Figure 8:
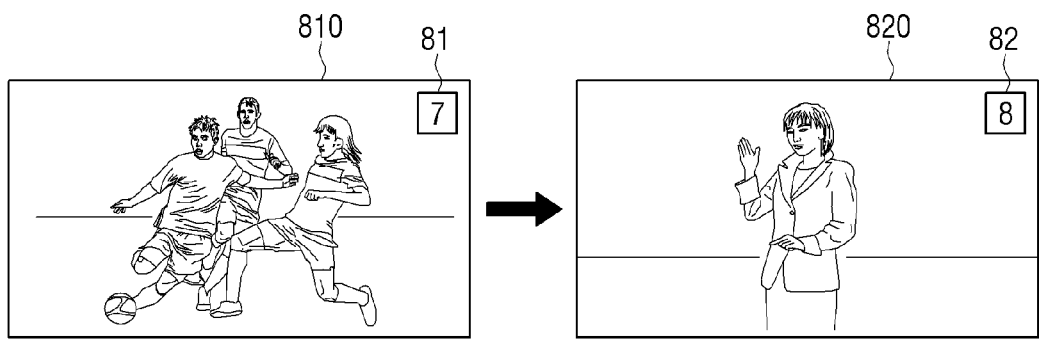
FIG. 8 is a view illustrating image change sensing of a display apparatus according to an exemplary embodiment.

FIG. 8 is a view illustrating determining a control command corresponding to a received control signal based on an image change by using the display apparatus 100, according to an exemplary embodiment.

As shown in FIG. 8, a first image 810 is an image provided before the display apparatus 100 receives a control signal for controlling the image providing apparatus 200 from the remote control device 300", and a second image 820 is an image provided after receiving the control signal.

The processor 130 of the display apparatus 100 may determine a control command corresponding to the control signal is a control command for turning a channel up by comparing the first image 810 and the second image 820. In detail, the processor 130 may determine that a channel is changed from 7 to 8 and determine the control command is for turning the channel up by extracting a channel number area 81 of the first image 810, extracting a channel number area 82 of the second image 820, and recognizing channel numbers of the extracted areas through OCR.

According to another method, the processor 130 may extract characteristic information of the first image 810 and the second image 820 and transmit the extracted characteristic information to an external server capable of recognizing an image based on characteristic information of the image. Also, the processor 130 may determine that a channel is turned up by receiving channel information corresponding to the first image 810 and channel information corresponding to the second image 820 from the external server. Here, the characteristic information transmitted to the external server may be a watermark or a fingerprint that is unique to an image.

As another example, the processor 130 may compare images provided before and after receiving a control signal and, if an object instructing that a volume is changed in the image after receiving the control signal or a volume control on-screen display (OSD) appears, determine that a control command corresponding to the control signal is for adjusting the volume.

According to various types of well-known image analysis technologies besides the above-described method, the processor 130 may determine which command the control command corresponding to the received control signal is.

Also, the processor 130 may acquire apparatus information of the image providing apparatus 200 based on the determined control command and the received control signal. In detail, the display apparatus 100 may acquire the apparatus information of the image providing apparatus 200 by storing a plurality of control code sets corresponding to image providing apparatuses of known manufacturers and checking a control code set matching with the received control signal and the determined control command among the plurality of preloaded control code sets.

Sometimes, even between different manufacturers a control signal corresponding to a particular control command may be the same. For example, if a control signal for turning a channel up in a control code set of manufacturer A and a control signal for turning a channel up in a control code set of manufacturer B are the same as each other, a plurality of pieces of apparatus information of the image providing apparatus 200 may be acquired through a control signal analysis and an image change analysis as described above, and thus one manufacturer may not be specified.

Therefore, according to an aspect of an exemplary embodiment, if an image provided from the image providing apparatus 200 includes contents for specifying the image providing apparatus 200, apparatus information of the image providing apparatus 200 may be acquired through an image analysis. In detail, as described with reference to FIG. 3, apparatus information of the image providing apparatus 200 may be acquired by sensing a specific logo from an image provided from the image providing apparatus 200.

Also, if an accuracy of a logo recognition is lowered although an image analysis technology for sensing a logo in an image is used, a plurality of pieces of apparatus information may be acquired, and thus one manufacturer may not be specified.

Therefore, in this case, if a method of analyzing a control signal and an image change and a method of analyzing contents indicating a business operator (i.e., manufacturer) in an image are used together, apparatus information of the image providing apparatus 200 may be accurately acquired. In other words, the processor 130 may finally acquire apparatus information of the image providing apparatus 200 by receiving a control signal transmitted from the remote control device 300", determining a control command corresponding to the control signal through a changed image in response to the control signal, and sensing a specific object in an image provided from the image providing apparatus 200.

As described above, the display apparatus 100 may autonomously acquire apparatus information of the image providing apparatus 200. Alternatively, the display apparatus 100 may acquire apparatus information of the image providing apparatus 200 with assistance from a server. In detail, the processor 130 of the display apparatus 100 may control the communicator 110 to transmit the determined control command and control signal to the server so as to receive apparatus information of the image providing apparatus 200 from the server. Also, the display apparatus 100 may be provided with pieces of data necessary for an image analysis (e.g., information about a manufacturer logo) from the server.

A process of acquiring apparatus information of the image providing apparatus 200 as described above may start according to conditions where the image providing apparatus 200 is newly sensed, and a control signal for controlling the image providing apparatus 200 is received. Therefore, merely when the control signal is received, the process of acquiring the apparatus information may be performed, and thus a memory waste may be reduced. Here, the newly sensing the image providing apparatus 200 may indicate that a new image providing apparatus 200 is sensed in the display apparatus 100. As a detailed example, the newly sensing the image providing apparatus 200 may indicate that the new image providing apparatus 200 is connected to an input port of the display apparatus 100.

Figure 9:
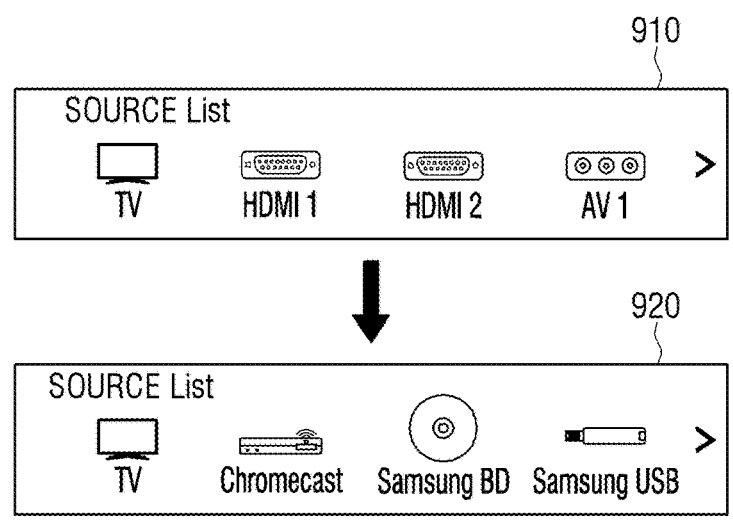
FIG. 9 is a view illustrating source list providing of a display apparatus according to an exemplary embodiment.

FIG. 9 is a view illustrating an example of using acquired apparatus information of the image providing apparatus 200.

FIG. 9 illustrates a source list provided from the display apparatus 100. In other words, FIG. 9 illustrates a comparison between a source list 910 provided before acquiring apparatus information of the image providing apparatus 200 and a source list 920 provided after acquiring the apparatus information. A source list as mentioned above may be displayed on the display 120 according to a user command input through the remote control device 300.

In detail, if apparatus information of the image providing apparatus 200 is acquired as in the above-described exemplary embodiment, the processor 130 may update a source name corresponding to the image providing apparatus 200 by using the acquired apparatus information of the image providing apparatus 200.

As shown in FIG. 9, before acquiring the apparatus information, a source list including port names (HDMI 1, HDMI 2, AV 1, or the like) of sources are provided in the display apparatus 100 like a source list 910 that is not updated. After acquiring the apparatus information, a source names may be updated, and thus a list including manufacturer information (Samsung, Chromecast, or the like) may be provided like the updated source list 920.

Also, the updated source list 920 may provide manufacturer information and information about device types. For example, the updated source list 920 may include manufacturer information and device types if an image providing apparatus is a set-top box. The updated source list 920 may include device types if the image providing apparatus is a BD player, a digital video recorder (DVR), or a home theater system (HTS). Also, the updated source list 920 may include manufacturer information and a device name if the image providing apparatus is an OTT device or a gaming console. Information about device types may be acquired by using different methods according to devices. For example, the user may acquire information about a device type by directly inputting the information about the device type into the display apparatus 100 or may acquire the information about the device type through a connection to the display apparatus 100.

Apparatus information of the image providing apparatus 200 may be used to update a source name or may be transmitted to an external server to be collected as described above. Therefore, the external server may provide a service appropriate for a business operator of the image providing apparatus 200 through the display apparatus 100. For example, the external server may provide the display apparatus 100 with an Electronic Program Guide (EPG) corresponding to the business operator of the image providing apparatus 200. Also, the apparatus information of the image providing apparatus 200 may be used for a statistical purpose.

Figure 10:
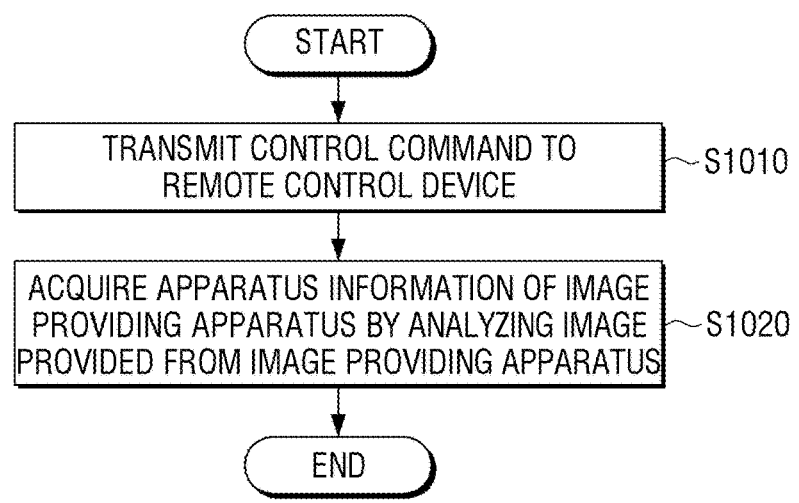
FIGS. 10 through 12 are flowcharts of methods of controlling a display apparatus according to various exemplary embodiments.

FIG. 10 is a flowchart of a method of controlling the display apparatus 100, according to an exemplary embodiment.

As shown in FIG. 10, in operation S1010, the display apparatus 100 transmits a control command, which enables the remote control device 300 to transmit a specific control signal, to the remote control device 300. A control command transmission operation described above may be performed if the image providing apparatus 200 is first connected to the display apparatus 100. Alternatively, as described with reference to FIG. 6, the control command transmission operation may be performed if a user starts setting an integrated remote control in order to control the image providing apparatus 200 by using the remote control device 300.

Also, after transmitting the control command as described above, the display apparatus 100 may acquire apparatus information of the image providing apparatus 200 by analyzing an image provided from the image providing apparatus 200.

Data (e.g., a logo of each manufacturer) for acquiring the apparatus information of the image providing apparatus 200 may be stored (i.e., preloaded) in the display apparatus 100 or may be stored in an external server. If the data is stored in the external server, the display apparatus 100 may acquire the apparatus information of the image providing apparatus 200 from the external server by transmitting the image provided from the image providing apparatus 200 to the external server or may be provided with the data from the external server. If the display apparatus 100 fails to acquire the apparatus information, the display apparatus 100 may be provided with additional data from the external server to update the data of the display apparatus 200 by transmitting the failure result to the external server, and the external server may perform a supplementary work so as to perform an accurate image recognition based on the failure result.

The method of acquiring the apparatus information of the image providing apparatus 200 through the image analysis has been described in the above-described exemplary embodiment. According to an aspect of an exemplary embodiment, if the image providing apparatus 200 is an apparatus that is connectable through HDMI, the display apparatus 100 may easily acquire the apparatus information of the image providing apparatus 200 by checking Consumer Electronics Control (CEC) information and the like. If the display apparatus 100 is not capable of checking the CEC information and the like, the display apparatus 100 may acquire the apparatus information through the above-described image analysis. As described above, the display apparatus 100 may drive a multistage process in order to acquire the apparatus information of the image providing apparatus 200. The present exemplary embodiment will be described in more detail with reference to FIG. 11.

Figure 11:
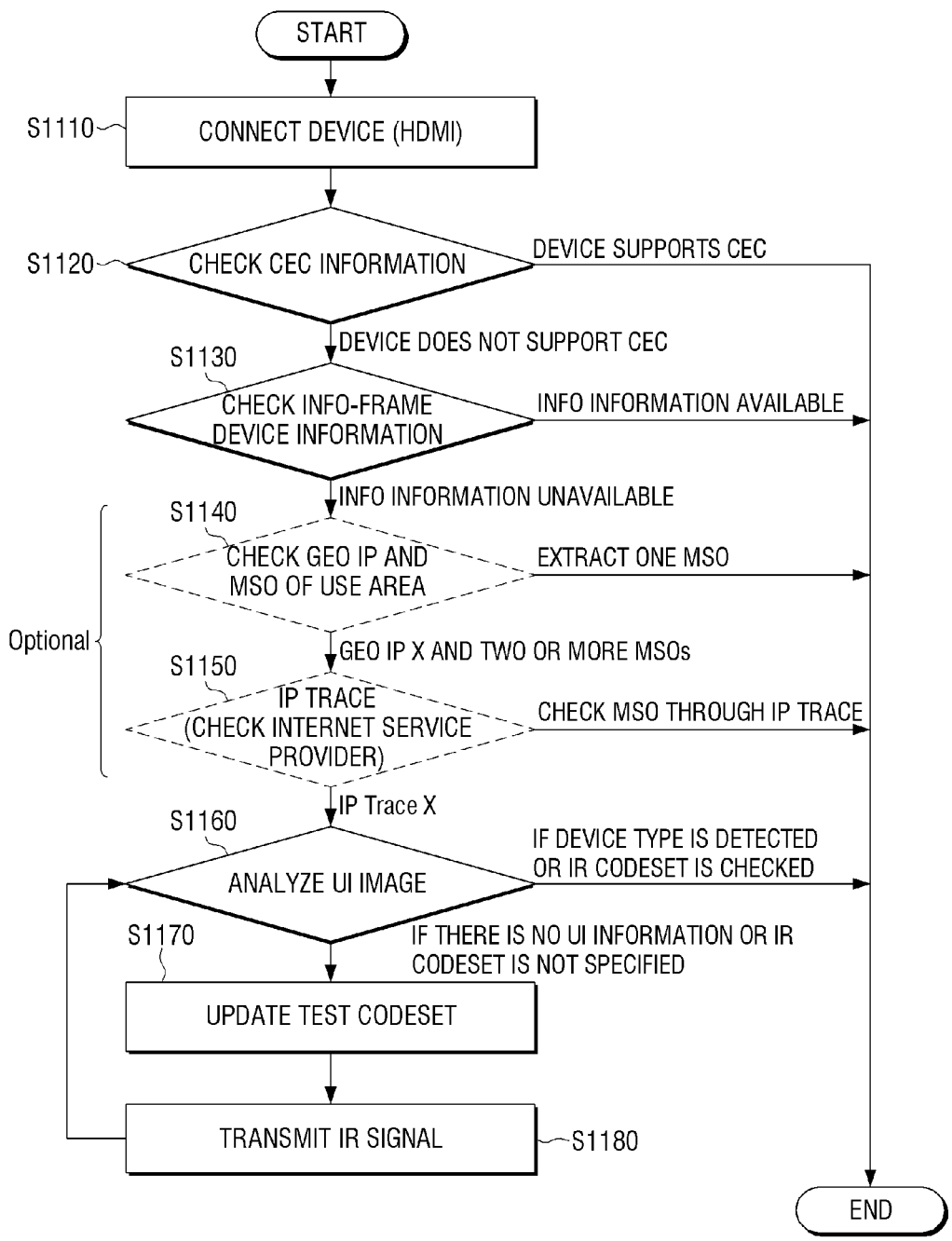

FIG. 11 is a flowchart of a process of acquiring apparatus information of the image providing apparatus 200 by using the display apparatus 100, according to an exemplary embodiment.

As shown in FIG. 11, if the image providing apparatus 200 is connected to the display apparatus 100 through HDMI in operation S1110, the display apparatus 100 checks CEC information in operation S1120. A CEC may enable devices connected to one another through HDMI to control one another, and if the devices support the CEC function, CEC information may include business operator (e.g., manufacturer) information of the image providing apparatus 200.

However, if the CEC information many not include the manufacturer information or the display apparatus 100 may not be a device supporting the CEC function, in which case the display apparatus 100 may check manufacturer information in an Info-frame in operation S1130.

If there is no manufacturer information in the Info-frame, the display apparatus 100 may check the geographical location of the display apparatus 100 by checking a GEO IP and check a Multiple Service Operator (MSO) of the area in operation S1140. An image providing apparatus (e.g., a set-top box) of a particular manufacturer may be strongly tied to a particular geographical area. Therefore, the MSO of the image providing apparatus 200 may be checked merely by checking the GEO IP to check an area where the display apparatus 100 is located, thereby specifying a manufacturer of the image providing apparatus 200.

However, if the GEO IP is not detected or a plurality of MSOs exist in the corresponding area, the display apparatus 100 may perform an Internet Protocol (IP) trace. In detail, if the image providing apparatus 200 is a set-top box, a business operator associated with the set-top box generally provides an Internet service together, and the set-top box and the Internet service of the same business operator are generally used together. Also, because an IP address includes information for specifying a business operator, the display apparatus 100 may acquire apparatus information of the image providing apparatus 200 by performing the IP trace.

However, if acquiring the apparatus information through the IP trace is impossible, an image analysis as described with reference to FIGS. 5 and 6 may be performed in operation S1160. In detail, the display apparatus 100 may store an IR code set of a major manufacturer of an image providing apparatus and transmits a control command including an IR code set of a particular manufacturer through a Bluetooth communication. Also, the remote control device 300' generates an IR signal according to a control command transmitted from the display apparatus 100. Therefore, if the image providing apparatus 200 operates to provide the display apparatus 100 with an image, the display apparatus 100 may check a type or an IR code set of the image providing apparatus 200 by analyzing a provided UI image.

If there is no UI information for specifying a manufacturer of the image providing apparatus 200 or an IR code set is not specified, the display apparatus 100 may update a test code set in operation S1170. In other words, the display apparatus 100 may transmit a control command including an IR code set of another manufacturer to the remote control device 300' through a Bluetooth communication. Also, the remote control device 300' transmits an IR signal according to a received control command in operation S1180. This process may be repeated until the apparatus information of the image providing apparatus 200 is acquired.

Operations S1140 and S1150 among above-described operations may be optional operations and may not be performed.

Also, an IR code set of each manufacturer has been described as being stored in the display apparatus 100 in the above-described exemplary embodiment but may be stored in the remote control device 300'. Alternatively, the display apparatus 100 may be provided with an IR code set of each business operator from an external server.

Figure 12:
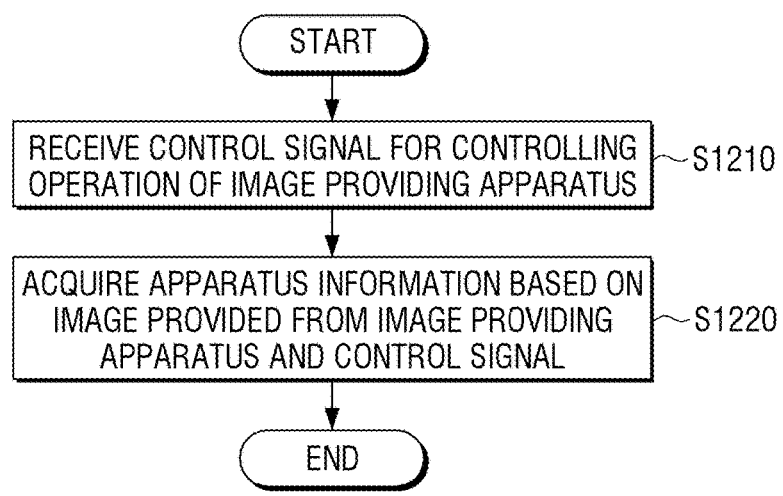

FIG. 12 is a flowchart of a method of controlling the display apparatus 100, according to another exemplary embodiment.

In FIG. 12, the display apparatus 100 receives a control signal for controlling an operation of the image providing apparatus 200 in operation S1210. The control signal is an IR signal transmitted from the remote control device 300" capable of controlling the image providing apparatus 200. The display apparatus 100 may receive the IR signal, which is generated for controlling the image providing apparatus 200, by performing IR sniffing.

Also, the display apparatus 100 acquires apparatus information of the image providing apparatus 200 based on an image provided from the image providing apparatus 200 after receiving the control signal and the received control signal in operation S1220.

According to an exemplary embodiment, the display apparatus 100 may sense an image change type by comparing an image provided from the image providing apparatus 200 before the remote control device 300" transmits the control signal and an image provided from the image providing apparatus 200 after the remote control device 300" transmits the control signal and may acquire the apparatus information of the image providing apparatus 200 based on the sensed image change type and the control signal that the display apparatus 100 receives from the remote control device 300".

However, if a plurality of pieces of apparatus information are acquired, the display apparatus 100 may select one of the plurality of pieces of apparatus information by recognizing contents for recognizing a manufacturer of the image providing apparatus 200 (e.g., a logo of the image providing apparatus 200 (refer to FIG. 3), a matching relation between a channel number and a broadcast logo (refer to FIG. 4), and the like) from an image provided from the image providing apparatus 200.

According to an aspect of an exemplary embodiment, the display apparatus 100 may detect contents for recognizing a manufacturer of the image providing apparatus 200 from an image provided from the image providing apparatus 200. If a plurality of pieces of apparatus information are acquired based on the detected contents, the display apparatus 100 may additionally select one of the plurality of pieces of apparatus information based on an image change type and a control signal as described above.

In other words, as a method by which the display apparatus 100 acquires apparatus information of the image providing apparatus 200 by using the remote control device 300", a method performed based on an IR-sniffed control signal and image change sensing, a method of sensing contents for specifying a manufacturer from an image provided from the image providing apparatus 200, or a method of performing the two methods may be used.

In the first and third methods, if the display apparatus 100 sniffs an IR signal, an apparatus information acquiring process may start, and thus a memory waste may be reduced.

Figure 13:
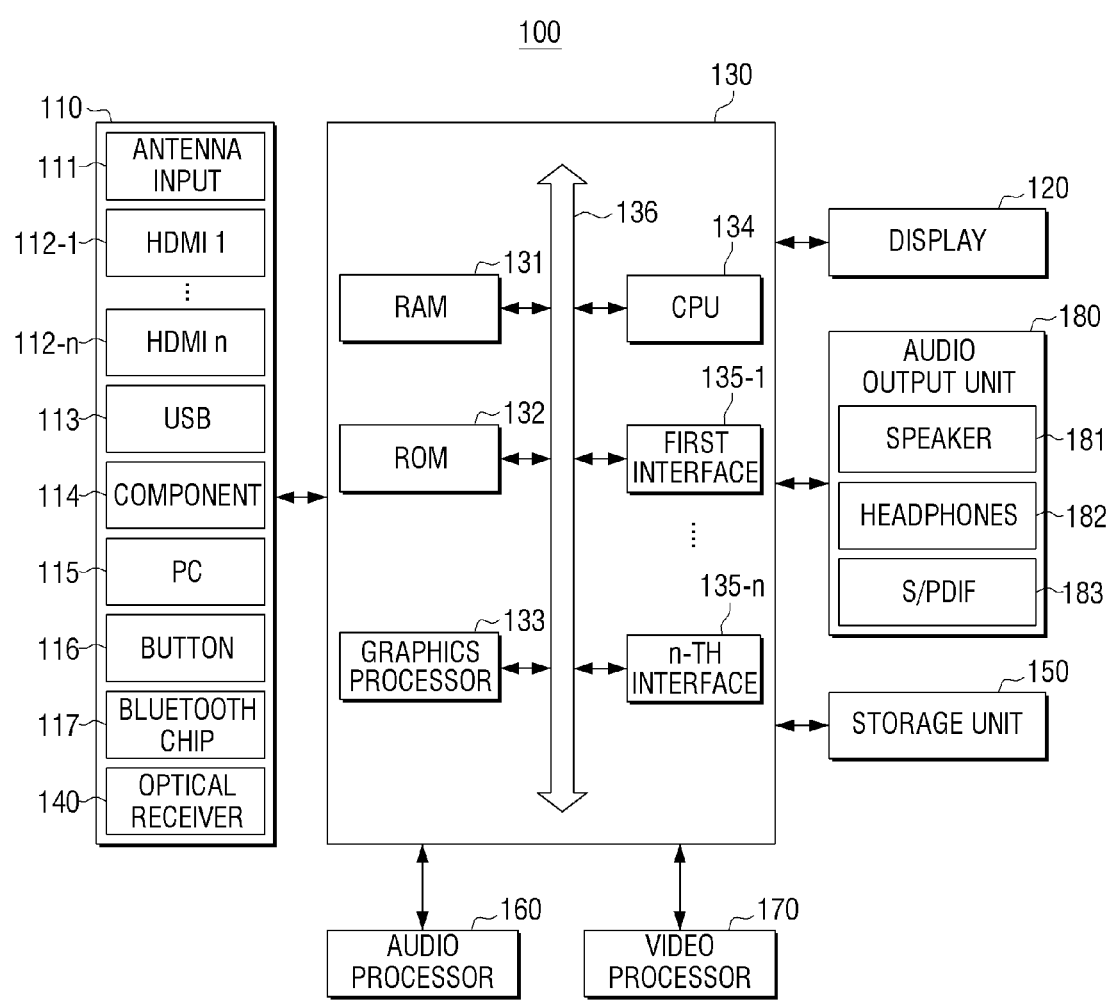
FIG. 13 is a block diagram of a detailed configuration of a display apparatus according to an exemplary embodiment.

FIG. 13 is a block diagram of a detailed configuration of the display apparatus 100, according to an exemplary embodiment. The display apparatus 100 may further include elements, such as a optical receiver 140, a storage unit 150, a audio processor 160, a video processor 170, an audio output unit 180, and the like, as well as a communicator 110, a display 120, and a processor 130.

Repeated descriptions of the same operations of operations of the communicator 110, the display 120, and the processor 130 as the operations described above are omitted.

The communicator 110 may include an antenna input port 111, first through n-th HDMI input ports 112-1 through 112-n, a Universal Serial Bus (USB) port 113, a component input jack 114, a PC input port 115 (e.g., a video graphics adapter (VGA) port), a button 116, a Bluetooth chip 117, the optical receiver 140, and the like.

The optical receiver 140 may receive a light signal such as an IR signal through a light window. The IR signal received through the optical receiver 140 may be a signal for controlling the display apparatus 100 or a signal received by IR-sniffing a signal for controlling another apparatus.

The processor 130 may specify the IR signal by analyzing a waveform of the IR signal received through IR sniffing. Also, the processor 130 may sense an image change corresponding to the IR signal by analyzing an image received through the communicator 110 and determine a control command corresponding to the IR signal by checking a type of the sensed image change. In addition, the processor 130 may acquire apparatus information corresponding to the determined control command and IR signal as apparatus information of the image providing apparatus 200.

The communicator 110 may include a communication chip such as the Bluetooth chip 117. Besides this, although not shown, the communicator 110 may include various types of communication chips such as a Wi-Fi chip, an NFC chip, a wireless communication chip, and the like. If the Bluetooth chip 117 is used, the communicator 110 may transmit and receive various types of connection information such as a subsystem identification (SSID), a session key, and the like, perform communication connections by using the various types of connection information, and transmit and receive various types of information.

The display apparatus 100 may include a tuner to select a broadcast channel received through the antenna input port 111.

The processor 130 may transmit various types of control commands to the remote control device 300 through the communicator 110 according to a Bluetooth communication method. In particular, the processor 130 may transmit a control command including an IR code set to the remote control device 300 according to a Bluetooth method.

The button 116 may be a power button, a mute button, a volume change button, or a channel change button.

The audio processor 160 is an element that performs processing with respect to audio data. The audio processor 160 may perform various types of processing, such as decoding, amplifying, noise filtering, and the like, with respect to the audio data.

The video processor 170 is an element that performs processing with respect to image data received by the communicator 110. The video processor 170 may perform various types of image processing, such as decoding, scaling, noise filtering, frame rate converting, resolution converting, and the like, with respect to the image data.

The audio output unit 180 may include a speaker 181, a headphones output terminal 182, or a Sony/Philips Digital Interface (S/PDIF) 183 for outputting the audio data processed by the audio processor 160.

The storage unit 150 may store various types of data, programs, or applications for driving and controlling the display apparatus 100 under control of the processor 130.

The storage unit 150 may include a nonvolatile memory, a volatile memory, a hard disc drive (HDD), or a solid-state drive (SSD). Also, the storage unit 150 includes a memory card (e.g., a micro Secure Digital (SD) card, a USB memory, or the like) installed in the display apparatus 100.

The storage unit 150 may store various types of modules such as an image processing module, an image recognizing module, an IR sniffing module, and the like. Also, the storage unit 150 may store a broadcast receiving module, a channel controlling module, a volume controlling module, a communication controlling module, a voice recognizing module, a motion recognizing module, a light receiving module, a display controlling module, an audio controlling module, an external input controlling module, and a power controlling module. These various modules may be implemented with hardware, software, or a combination thereof. The storage unit 150 may also store IR code sets, business operator logos, broadcast logos, and the like of various business operators of an image providing apparatus.

The processor 130 controls an overall operation of the display apparatus 100 by using various types of programs stored in the storage unit 150.

The processor 130 includes a random access memory (RAM) 131, a read-only memory (ROM) 132, a graphics processor 133, a central processing unit (CPU) 134, first through n-th interfaces 135-1 through 135-n, and a bus 136. Here, the RAM 131, the ROM 132, the graphics processor 133, the CPU 134, the first through n-th interfaces 135-1 through 135-n, and the like may be connected to one another through the bus 136.

The ROM 132 stores a command set and the like for system booting. If power is supplied by an input of a turn-on command, the CPU 134 boots a system by copying an OS stored in the storage unit 150 into the RAM 131 and executing the OS according to a command stored in the ROM 132. If the system is completely booted, the CPU 134 performs various operations by coping various types of application programs stored in the storage unit 150 into the RAM 131 and executing the application programs copied into the RAM 131.

The graphics processor 133 generates a screen including various types of objects such as an icon, an image, a text, and the like by using an operator and a renderer. The operator calculates attribute values such as coordinate values at which objects will be respectively displayed, shapes, sizes, and colors of the objects, and the like according to a layout of the screen. The renderer generates a screen having various types of layouts including objects based on the attribute values calculated by the operator. The screen generated by the renderer is displayed in a display area of the display 120.

The first through n-th interfaces 135-1 through 135-n are connected to various types of elements as described above. One of interfaces may be a network interface that is connected to an external apparatus through a network.

For example, the CPU 134 may copy an image analysis module stored in the storage unit 150 into the RAM 131 and execute the image analysis module. Therefore, the CPU 134 may acquire apparatus information of the image providing apparatus 200 by analyzing an image received from the image providing apparatus 200.

Various exemplary embodiments described above may be embodied in a recording medium that may be read by a computer or a similar apparatus to the computer by using software, hardware, or a combination thereof. According to the hardware embodiment, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, exemplary embodiments that are described in the present specification may be embodied as the processor 130. According to the software embodiment, embodiments such as processes and functions described in the present specification may be embodied as additional software modules. The software modules may respectively perform one or more functions and operations described in the present specification.

Methods of controlling a display apparatus according to various exemplary embodiments may be stored on a non-transitory readable medium. The non-transitory readable medium may be installed and used in various types of apparatuses.

The non-transitory computer readable medium is a medium which does not store data temporarily such as a register, cash, and memory but stores data semi-permanently and is readable by devices. More specifically, the aforementioned applications or programs including the method of controlling the display apparatus may be stored in the non-transitory computer readable media such as compact discs (CDs), digital video discs (DVDs), hard disks, Blu-ray discs, Universal Serial Bus (USB) memory modules, memory cards, and read-only memory (ROM).

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display system comprising:
   a display apparatus;
   an image providing apparatus configured to provide an image to the display apparatus; and
   a remote control device configured to transmit control signals for controlling the image providing apparatus,
   wherein the display apparatus is configured to:
   control the remote control device to transmit a first control signal included in a first control code set to the image providing apparatus,
   based on the image provided by the image providing apparatus being changed in response to sensing of the first control signal, acquire apparatus information, which identifies the image providing apparatus, based on the changed image and the first control signal, and
   based on the image not being changed in response to sensing of the first control signal, control the remote control device to transmit a second control signal included in a second control code set to the image providing apparatus,
   wherein at least one of a manufacturer or a model corresponding to the second control code set is different from at least one of a manufacturer or a model corresponding to the first control code set.

2. A display apparatus for displaying an image provided by an external image providing apparatus, the display apparatus comprising:
   a communicator;
   a display; and
   a processor configured to:
   control the communicator to transmit, to a remote control device, a first control command which controls the remote control device to transmit a first control signal included in a first control code set to the external image providing apparatus,
   based on the image provided by the external image providing apparatus being changed in response to sensing of the first control signal, acquire apparatus information, which identifies the external image providing apparatus, based on the changed image and the first control signal, and
   based on the image not being changed in response to sensing of the first control signal, transmit, to the remote control device, a second control command which controls the remote control device to transmit a second control signal included in a second control code set to the external image providing apparatus,
   wherein at least one of a manufacturer or a model corresponding to the second control code set is different from at least one of a manufacturer or a model corresponding to the first control code set.

3. The display apparatus of claim 2, wherein the processor is further configured to control the communicator to sequentially transmit, to the remote control device, a plurality of control commands, which controls the remote control device to sequentially transmit different control signals.

4. The display apparatus of claim 2, wherein the first control signal controls the external image providing apparatus to provide the image comprising a logo to the display apparatus.

5. The display apparatus of claim 2, wherein the first control signal controls the external image providing apparatus to provide a menu screen of the external image providing apparatus to the display apparatus.

6. The display apparatus of claim 2, wherein the processor is further configured to control the communicator to transmit the first control command to the remote control device based on the external image providing apparatus being newly sensed by the display apparatus.

7. The display apparatus of claim 2, wherein the processor is further configured to acquire the apparatus information of the external image providing apparatus by sensing a logo from the image provided from the external image providing apparatus after transmitting the first control command.

8. The display apparatus of claim 2, wherein the processor is further configured to update a source name of the external image providing apparatus based on the acquired apparatus information.

9. The display apparatus of claim 2, wherein the processor is further configured to based on the image provided by the image providing apparatus being changed in response to the sensing of the first control signal, control the communicator to transmit information regarding the first control code set, which is a control code set corresponding to the acquired apparatus information, to the remote control device.

10. The display apparatus of claim 2, wherein the processor is further configured to, based on the image not being changed after transmitting the first control command a preset number of times, control the display to display a user interface (UI) regarding an adjustment of an orientation of the remote control device.

11. A method of controlling a display apparatus, the method comprising:
   transmitting, to a remote control device, a first control command, which controls the remote control device to transmit a first control signal included in a first control code set to an external image providing apparatus;
   based on an image provided by the external image providing apparatus being changed in response to sensing of the first control signal, acquiring apparatus information, which identifies the external image providing apparatus, based on the changed image and the first control signal; and based on the image not being changed in response to sensing of the first control signal, transmitting, to the remote control device, a second control command which controls the remote control device to transmit a second control signal included in a second control code set to the external image providing apparatus, wherein at least one of a manufacturer or a model corresponding to the second control code set is different from at least one of a manufacturer or a model corresponding to the first control code set.

12. The method of claim 11, wherein the transmitting comprises sequentially transmitting, to the remote control device, a plurality of control commands, which controls the remote control device to sequentially transmit different control signals.

13. The method of claim 11, wherein the first control signal controls the external image providing apparatus to provide the image comprising a logo to the di splay apparatus.

14. The method of claim 11, wherein the first control signal controls the external image providing apparatus to provide a menu screen of the external image providing apparatus to the display apparatus.

15. The method of claim 11, wherein the transmitting comprises transmitting the first control command to the remote control device based on the external image providing apparatus being newly sensed.

16. The method of claim 11, wherein the acquiring the apparatus information of the external image providing apparatus comprises sensing a logo from the image provided by the external image providing apparatus in response to the external image providing apparatus receiving the first control signal transmitted by the remote control device.

17. The method of claim 11, further comprising updating a source name of the external image providing apparatus based on the acquired apparatus information.

18. The method of claim 11, further comprising based on the image provided by the image providing apparatus being changed in response to the sensing of the first control signal, transmitting information regarding the first control code set, which is a control code set corresponding to the acquired apparatus information, to the remote control device.

19. The method of claim 11, further comprising:

based on the image not being changed, after transmitting the first control command a preset number of times, displaying a user interface (UI) regarding an adjustment of an orientation of the remote control device.

* * * * *